United States Patent [19]

Schroeder

[11] 3,908,305
[45] Sept. 30, 1975

[54] MODEL AIRCRAFT PROPULSION

[76] Inventor: Lloyd A. Schroeder, 5391 Robinwood Dr., North Street, Mich. 48049

[22] Filed: Dec. 7, 1973

[21] Appl. No.: 422,688

[52] U.S. Cl. ................... 46/74 R; 46/76 R; 244/54
[51] Int. Cl.² ................... A63H 27/02; A63H 33/20
[58] Field of Search ............. 46/74, 76, 78; 244/54, 244/138 R, 139, 140

[56] References Cited
UNITED STATES PATENTS

| | | | |
|---|---|---|---|
| 1,836,319 | 12/1931 | Gehrung | 244/54 |
| 2,568,475 | 9/1951 | Vaughn | 46/86 C |
| 3,067,973 | 12/1962 | Halsey et al. | 244/140 |
| 3,204,368 | 9/1965 | Effinger et al. | 46/78 |
| 3,292,302 | 12/1966 | Estes et al. | 46/74 C |
| 3,699,708 | 10/1972 | Mabuchi | 46/76 |
| 3,777,420 | 12/1973 | Bosley et al. | 46/78 |

Primary Examiner—Louis G. Mancene
Assistant Examiner—Robert F. Cutting
Attorney, Agent, or Firm—Harness, Dickey & Pierce

[57] ABSTRACT

A power pod is releasably coupled with a model aircraft, such as a model glider plane, to initially power the aircraft into flight and to thereafter separate from the aircraft under the influence of gravity. In the preferred embodiments of the invention, an adaptor element is affixed to the underside of the model aircraft fuselage, and the power pod itself is releasably coupled with the adaptor. The releasable coupling of the power pod with the adaptor is structured such that the power pod remains coupled with the adaptor to thereby power the model aircraft into flight as long as the power pod is providing a forward thrust. In one embodiment, the power pod separates from the adaptor when operation of the power pod ceases; in another embodiment, the power pod remains coupled with the adaptor after operation of the power pod ceases with the pod separating from the adaptor upon command of a remote control radio signal. Upon separation of the power pod from the adaptor, a parachute stored within the pod is deployed by means of a rip cord connected at one end to the model aircraft. The rip cord includes a replaceable, breakable link which breaks as the pod and the deployed parachute fall away from the model aircraft. The power pod includes an adjustable engine mounting plate for permitting the angle of thrust to be established at optimum inclination. The adaptor includes a layer of deformable, resilient material which permits the adaptor to mount without modification to different fuselage configurations. The parachute is attached to the power pod in such a way that the power pod lands in an orientation which minimizes any risk of damage to the pod upon impact with the ground.

32 Claims, 15 Drawing Figures

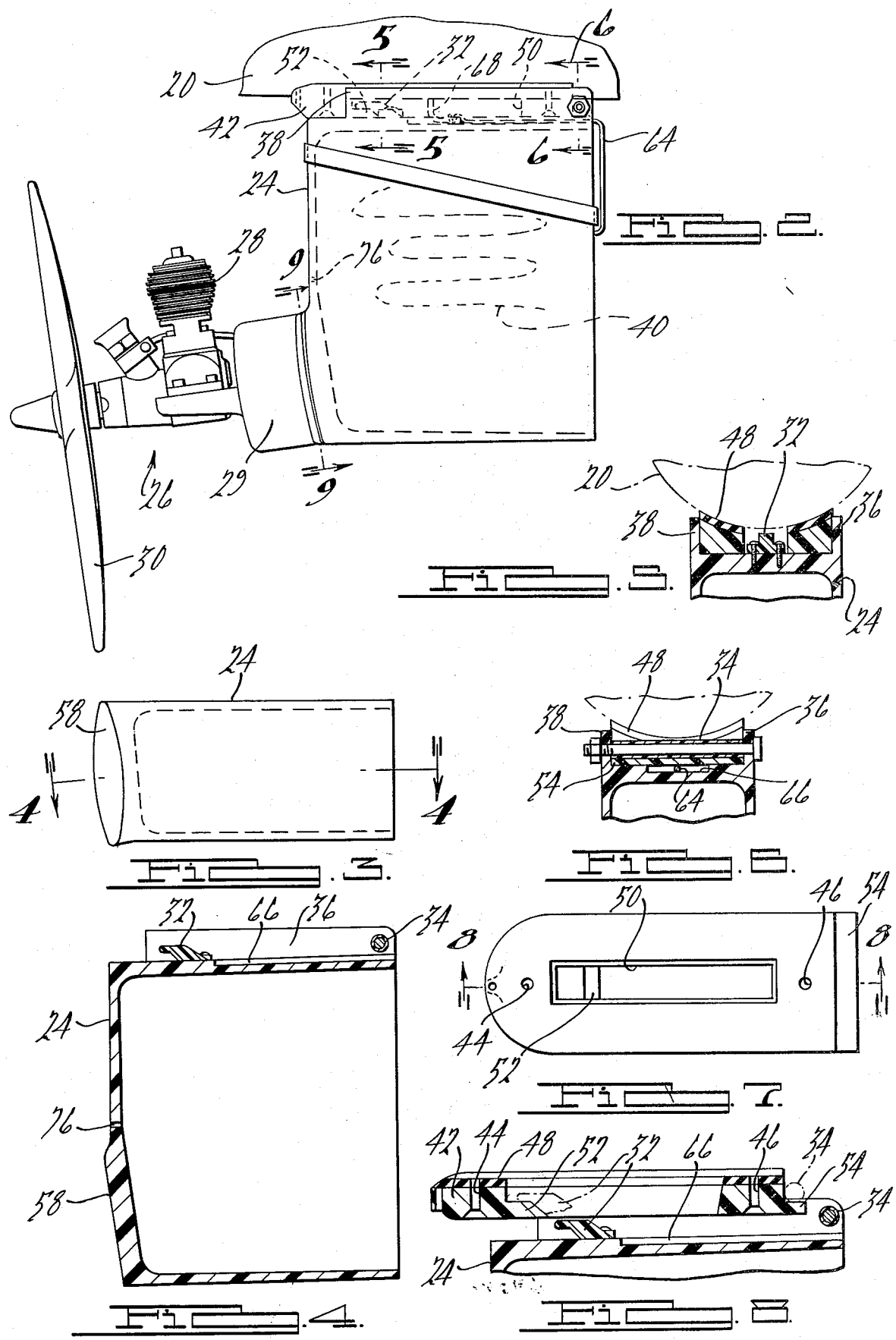

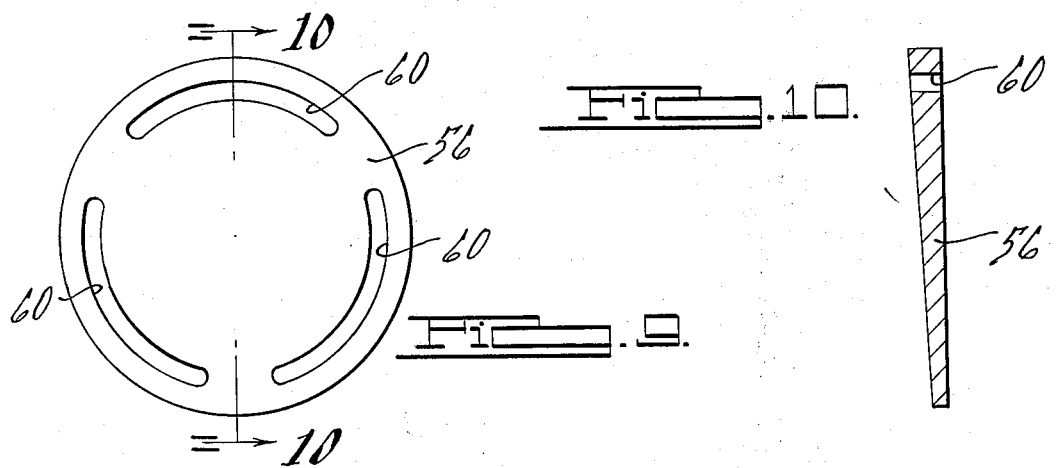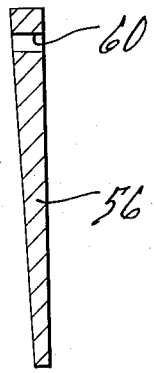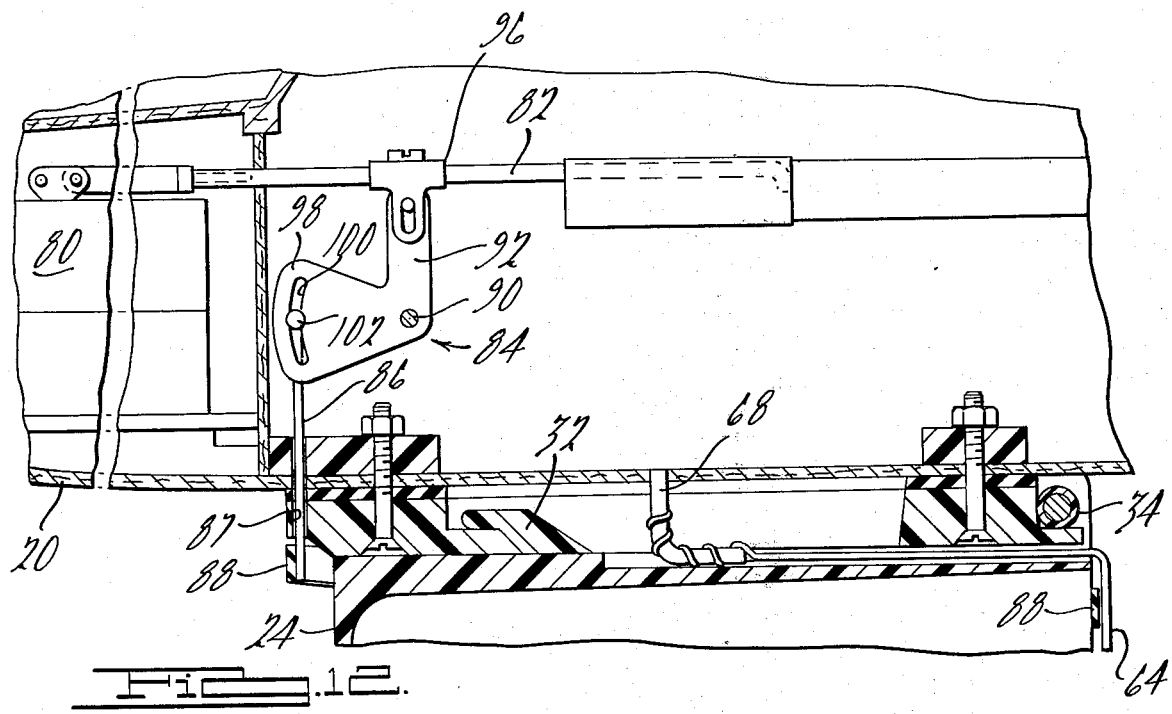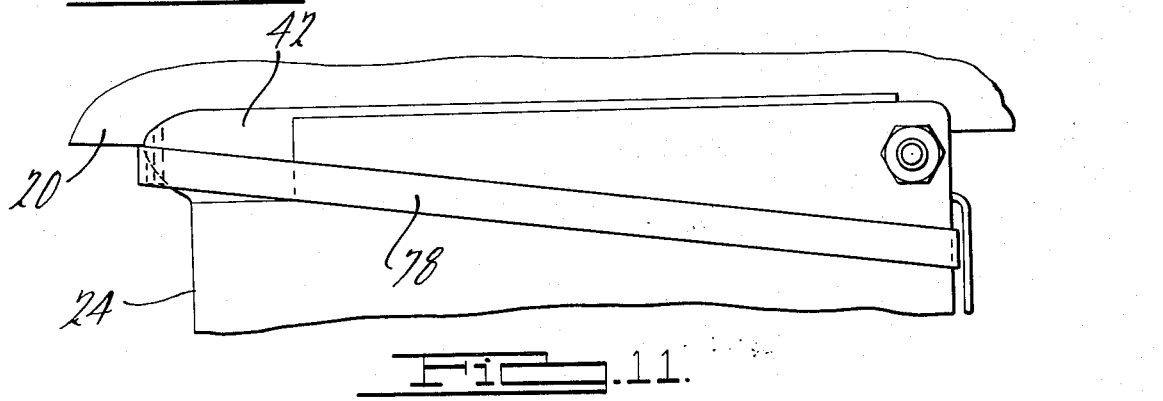

MODEL AIRCRAFT PROPULSION

BACKGROUND AND SUMMARY OF THE INVENTION

The present invention pertains generally to model aircraft and, more particularly, to a model aircraft power pod which is releasably coupled with the model aircraft to initially power the model aircraft into flight and thereafter separate from the model aircraft.

Model aircraft enthusiasts, in particular, model glider plane enthusiasts, have for a long time been confronted with the problem of making their model aircraft airborne. Up to now, various launching, or take-off, techniques have been tried, but these in general suffer from various limitations and possess undesirable features. For example, one already-known technique involves the use of a tow cable, one end of which attaches to a tow hook on the model aircraft. The cable extends for an appreciable distance along the ground, and the other end of the cable connects to a winch. The winch operates to wind up the cable and thereby pull the model aircraft along the ground with the aircraft becoming air-borne as it accelerates and thereafter disconnecting from the tow cable. This technique has at least several serious disadvantages. First, a relatively long, flat strip of ground, for example, several hundred feet, is required for set-up of the tow cable prior to take-off. Obviously, this involves the expenditure of a lot of time and energy for the set-up procedure. Second, since it is usually necessary that the model aircraft take off into the wind, the direction in which the tow cable is laid out is critical. If the wind should shift after the cable has been laid out, the operator must reorient the cable, assuming, of course, that the geographical terrain in the take-off area permits the cable to be conveniently reoriented. Needless to say, this procedure can at times try the patience of even the most devoted model aircraft enthusiast.

Another type of take-off arrangement has been proposed in U.S. Pat. No. 3,452,471 wherein a model stick glider is propelled into the air by means of a rocket motor pod. Although this arrangement is alleged to be capable of attaining vertical take-off, it has its own limitations and undesirable characteristics. One significant disadvantage is that an explosive ejection charge must be ignited to provide a rearward thrust to separate the rocket pod from the glider. Furthermore, the coupling between the rocket pod and the stick glider requires that the pod be bodily displaced upwardly and rearwardly relative to the stick glider before separation can occur.

The present invention is directed to a novel power pod for model aircraft, especially model glider planes, which overcomes the disadvantages of the prior techniques heretofore used in powering model aircraft into flight. With the present invention, a power pod is releasably coupled with a model glider to power the glider into flight and to thereafter separate from the glider by force of gravity without the need of any separate ejection charge and without the act of separation creating any undesired disturbance on the flight of the glider. Geographical considerations and wind direction are not critical, since the operator can easily aim the model aircraft in any desired heading at the time of take-off. The power pod can be arranged to separate from the glider either upon exhaustion of the fuel supply contained within the power pod or at a later time upon command of a remote control radio signal. According to the preferred embodiments of the present invention, an adaptor element is fixedly attached to the glider fuselage, and the power pod itself is releasably coupled with the adaptor. An advantage of the adaptor is that it can accommodate a variety of different fuselage shapes without modification. Thus, the invention has the advantage of utility with a large number of currently available model aircraft. As a further feature, the invention provides a mounting arrangement for the engine on the pod which permits the direction of thrust to be set to an optimum angle relative to the glider fuselage. A still further feature of the invention resides in positive deployment of a parachute from the pod which is effected by means of a rip cord having a replaceable, breakable link. Such positive deployment of the parachute ensures that the pod safely descends to earth. The parachute is so attached to the pod that the pod descends in an orientation which substantially minimizes the risk of damage to the pod upon impact with the ground. The invention can be practiced with a variety of propulsion sources, although a small single-cylinder engine and propeller are preferably used. Several components of the preferred embodiments of the invention can be advantageously constructed from molded plastics thereby providing economical manufacture and ease of assembly.

As a result of the present invention, the model aircraft enthusiast is relieved of the complicated procedures and the limitations of the prior art arrangements. Accordingly, the present invention promotes maximum enjoyment for the model aircraft enthusiast in his hobby and removes the possibility of his being frustrated by the complicated and cumbersome set-up procedures.

The foregoing features and advantages of the invention, along with additional features and advantages, will be seen in the ensuing description and claims which are to be taken in conjunction with the accompanying drawings. The drawings illustrate preferred embodiments of the invention in accordance with the best mode presently contemplated for carrying out the invention.

BRIEF DESCRIPTION OF THE DRAWINGS

FIG. 2 is an enlarged side elevational view of the power pod shown in FIG. 1;

FIG. 3 is a bottom view of the power pod housing;

FIG. 4 is a vertical sectional view of the power pod housing taken in the direction of arrows 4—4 in FIG. 3;

FIG. 5 is a vertical sectional view taken in the direction of arrows 5—5 in FIG. 2;

FIG. 6 is a vertical sectional view taken in the direction of arrows 6—6 in FIG. 2;

FIG. 7 is a top view of the adaptor shown by itself, the adaptor being affixed to the model aircraft and the power pod being connectable with the adaptor;

FIG. 8 is a longitudinal vertical sectional view through the adaptor of FIG. 7 taken in the direction of arrows 8—8 and further illustrating the manner in which the power pod releasably couples with the adaptor;

FIG. 9 is an enlarged sectional view taken in the direction of arrows 9—9 in FIG. 2;

FIG. 10 is a vertical sectional view taken in the direction of arrows 10—10 in FIG. 9;

FIG. 11 is a view illustrating a way to prevent the power pod from releasing from the model aircraft during flight, if such is desired;

FIG. 12 is a fragmentary vertical sectional view illustrating another embodiment of the invention;

DESCRIPTION OF THE PREFERRED EMBODIMENTS

Figure 1:
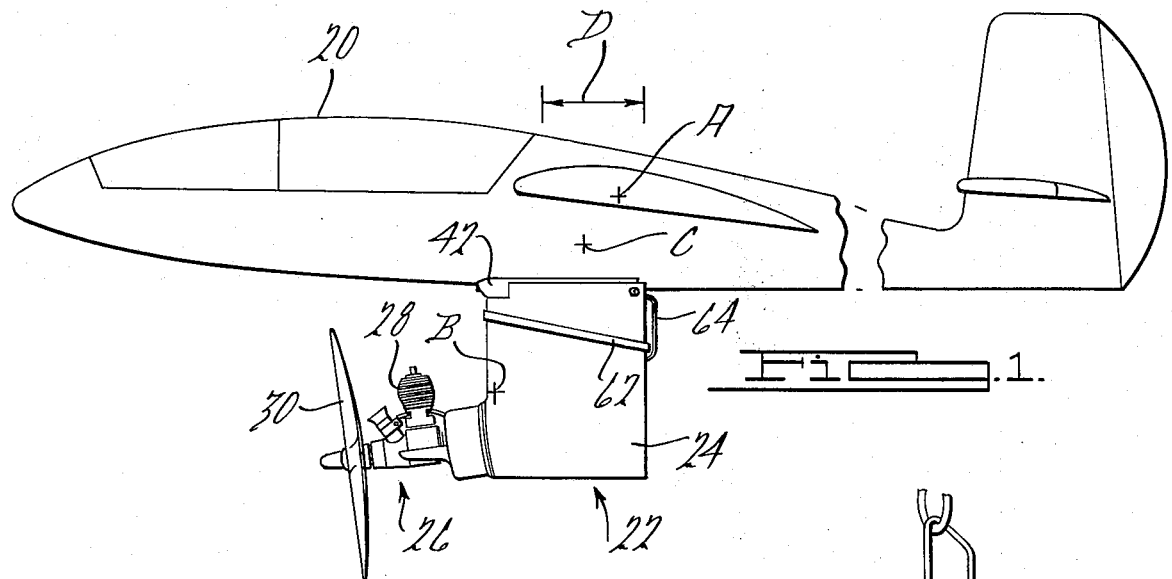
FIG. 1 is a side elevational view having a portion broken away of a model aircraft including a power pod constructed in accordance with the principles of the present invention.
Figure 14:
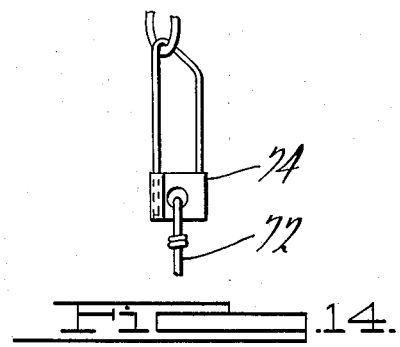
FIG. 14 is an enlarged view taken in circle 14 of FIG. 13.

FIG. 1 illustrates a model glider plane 20 having a power pod 22 embodying principles of the present invention connected to the underside of the fuselage. Details of power pod 22 and the connection thereof with glider plane 20 can be seen in greater detail in FIGS. 2–8. Power pod 22 includes: a hollow, generally rectangular housing 24; a porpulsion source 26 illustratively shown in the drawing as a single-cylinder engine 28 (for example, an engine of either 0.049–0.051 cubic inch displacement or 0.09–0.10 cubic inch displacement) and a propeller 30; a hook-type lug 32 affixed to the top wall of housing 24 by a pair of fasteners; and a transverse support rod 34 extending between longitudinally extending side flanges 36 and 38 and affixed to flanges 36, 38 by means of a nut and bolt (see FIG. 6). A parachute 40 is contained in stored position within the interior of housing 24. As best seen in FIG. 4, the rear of housing 24 is open. Housing 24 is releasably coupled via lug 32 and rod 34 with an adaptor element 42 which fixedly mounts to the underside of the fuselage of glider plane 20. Adaptor 42 may be conveniently affixed to the fuselage by passing fasteners through the longitudinally spaced holes 44 and 46 (FIGS. 7 and 8) in the adaptor and into the fuselage. The upper surface of adaptor 42 is contoured to approximately match the contour of typical glider plane fuselages, and according to one important aspect of the invention includes a layer 48 of a deformable, resilient material which is held compressed between adaptor 42 and the fuselage to permit the adaptor to fit snugly with the fuselage even though the contour of the upper surface of the adaptor and the corresponding surface of the fuselage may not exactly match. Accordingly, the adaptor can fit a variety of different fuselage shapes which are presently commercially available in model aircraft. Adaptor 42 is further provided with an elongated rectangular opening 50 at the forward end of which is situated a ledge 52. A second ledge 54 is provided across the rear of adaptor 42. As best seen in FIG. 8, power pod housing 24 releasably couples with adaptor 42. The solid line position of power pod housing 24 shown in FIG. 8 illustrates the relative positions of the pod and the adaptor preparatory to connecting the two, while the broken line position illustrates the coupled position. When the two are coupled, lug 32 rests on ledge 52 and rod 34 on ledge 54. As will be explained in greater detail hereinafter, power pod 22 remains coupled with adaptor 42 to power glider plane 20 into flight until the forward thrust of propulsion source 26 ceases. Thereafter, the power pod is permitted to separate from the adaptor and to fall away from the glider plane by force of gravity. It will be noted in FIGS. 5 and 6 that power pod housing 24 has a generally snug fit with adaptor 42. It has been found that a snug fit is beneficial since it minimizes resonant vibrations during operation of propulsion source 26. However, when the power pod separates from the adaptor, it is desirable that resistance to separation be minimized. It is desirable to maintain as snug a fit as possible when the adaptor and the pod are connected in order to minimize vibration, yet it is desirable that resistance to separation be minimized to facilitate the pod disconnecting from the adaptor. With one aspect of the invention, the friction between the flanges 36, 38 and adaptor 42 is minimized by molding housing 24 from polypropylene and adaptor 42 from nylon. A further benefit is that the polypropylene construction of the pod renders it a tough, yet lightweight, element. If desired, the allowable tolerance between the adaptor and the pod could be reduced (i.e., a closer fit could be provided) if lubricant is used between the pod and the adaptor to facilitate separation of the pod from the adaptor when the forward thrust of propulsion source 26 ceases. This would tend to minimize vibration even further while still facilitating separation. Ledges 52 and 54 could incline downwardly and rearwardly, if desired.

A further feature of the invention relates to the manner in which the power pod 22 is located with respect to the glider. For purposes of illustration, let it be assumed that the location identified by the letter A in FIG. 1 designates the center of gravity (c.g.) of glider plane 20 without pod 22 and adaptor 42. Furthermore, let it be assumed that the location identified by the letter B designates the c.g. of the power pod and adaptor by themselves. The power pod and adaptor are mounted in relation to location A such that the resultant c.g. assumes a location identified by the letter C. According to many present glider designs, the resultant c.g. of the glider must fall with the design limits of each particular glider; for example, within the longitudinal range designated by the distance D in FIG. 1. The distance $d_2$ of the resultant c.g. at location C from location A can be determined according to the following formula:

$$d_2 = \frac{M_1}{M_1 + M_2} \times d_1$$

where:
$M_1$ = mass of pod and adaptor
$M_2$ = mass of glider plane
$d_1$ = longitudinal distance between locations A and B (A minus B)
$d_2$ = longitudinal distance between locations A and C (A minus C)

After calculating the resultant c.g. C, it can be determined if this falls within the allowable range D. If so, the adaptor may be affixed to the fuselage in the particular location chosen. Alternatively, of course, the formula could be rearranged to determine the desired mounting location of the adaptor in order to produce a selected location for the resultant c.g. C. By way of example, the distance $d_1$ should be 2 ½ – 3 ¼ inches.

It will also be noted that, according to a further feature of the invention, the axis of engine 28, and hence the direction of thrust of propulsion source 26, inclines downwardly in the forward direction relative to the longitudinal axis of the glider. The thrust direction may be set to an optimum value by suitably positioning the engine on the pod through the use of a circular adjustment plate 56 which mounts between the integral engine fuel tank 29 and a circular mounting surface 58 provided at the lower end of the front wall of pod housing 24. Details of adjustment plate 56 are shown in FIGS. 9 and 10 wherein it can be seen that plate 56 has a wedge shape with the forward surface being inclined, by way of example, at approximately a 3° angle relative to the rear surface. At its narrowest point, the plate is, by way of example, approximately 1/16 inch thick. Plate 56 which may be advantageously molded from polyethylene includes a number of arcuately extending openings 60 corresponding to the mounting bolt pattern via which engine 28 mounts to pod housing 24. In the illustrated embodiment, three such openings 60 are provided to match the circularly arranged three-bolt pattern of the particular engine 28. With adjustment plate 56 disposed between engine 28 and pod housing 24, the engine mounting bolts may be loosened to permit adjustment plate 56 to be adjusted over a range equal substantially to the arcuate extent of slots 60. It will be appreciated that, because of the wedge shape of the adjustment plate, the angle of the engine axis relative to the pod is thereby varied. In order to achieve a greater amount of adjustment, the engine mounting bolts can be removed and the adjustment plate can be indexed. In this way, the thrust angle of the engine can be set to an optimum value for the particular glider plane with which it is used. A 15° angle has been found suitable in one instance, although it will be appreciated that the angle will depend upon the mass of a particular glider plane and the thrust of a particular propulsion source. It will also be noted that the engine mounting surface 58 of the pod is set at a small angle to the starboard side of the glider. This is beneficial in providing torque compensation.

Figure 13:
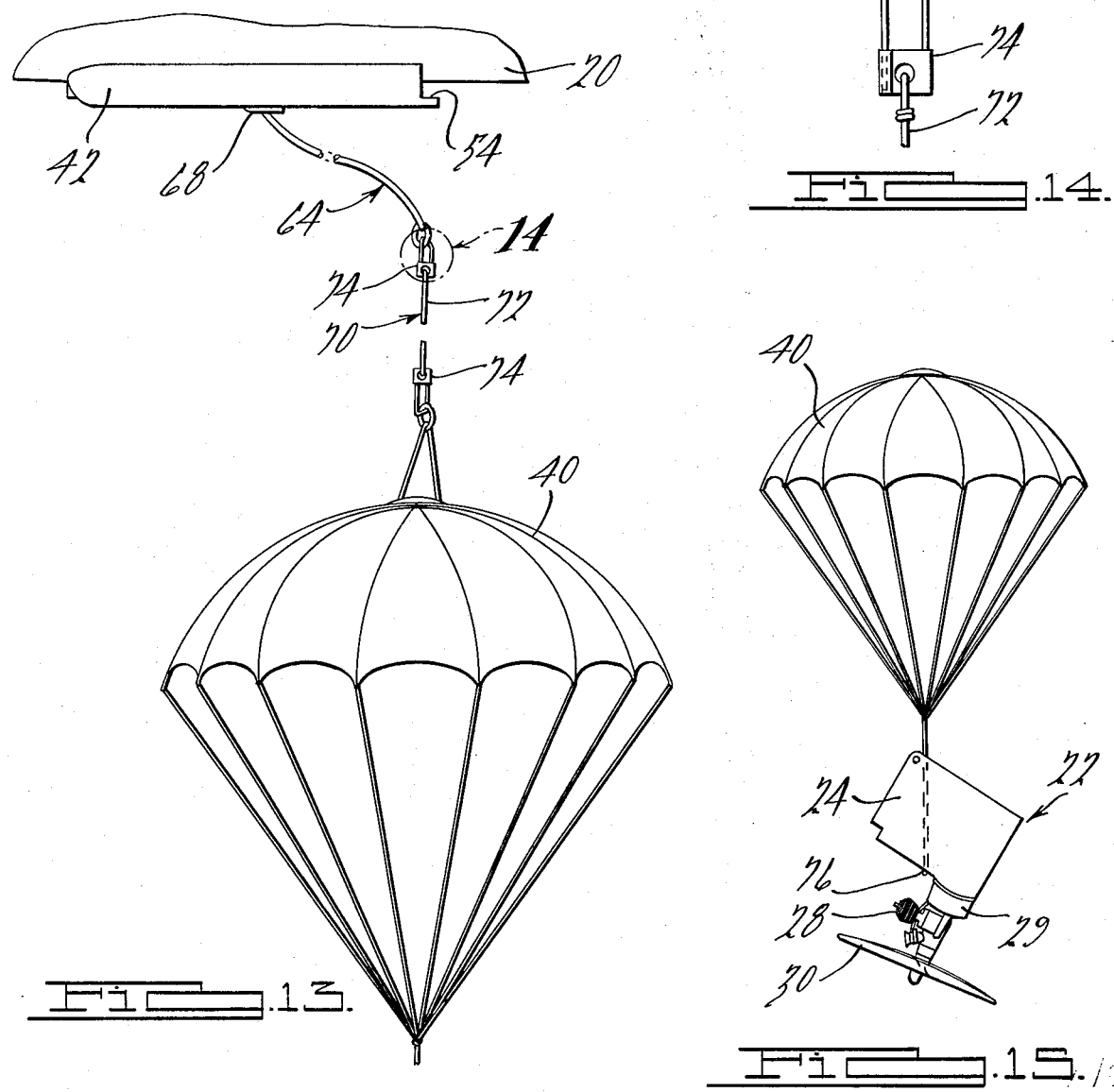
FIG. 13 is a view illustrating the initial deployment of the parachute from the power pod shortly after the power pod has separated from the aircraft.
Figure 15:
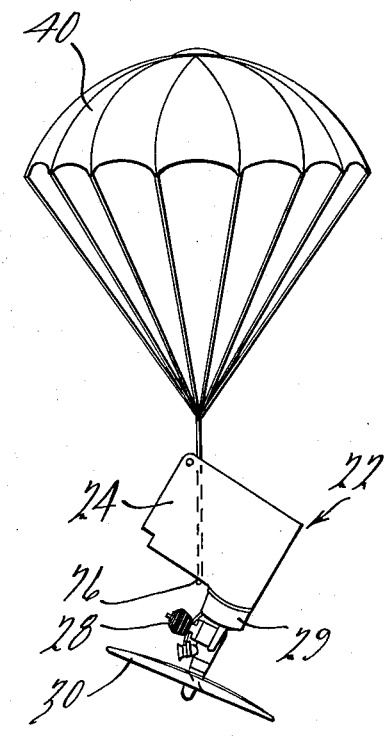
FIG. 15 is a view illustrating descent of the power pod after full deployment of the parachute.

Parachute 40 is suitably stored within pod housing 24, and it is intended to be deployed via the open rear end of the housing after engine 28 ceases to operate. It has been found desirable to place a rubber band 62 around the pod as indicated in FIG. 1 to prevent the parachute from prematurely deploying because of partial vacuum at the rear of the pod. A rip cord 64 has one end thereof connected to parachute 40 and extends beneath rubber band 62 as it exits from pod housing 24. The rip cord 64 extends upwardly around rubber band 62 and through a longitudinal channel 66 (see FIG. 6) provided in the top wall of pod housing 24. Channel 66 intercepts opening 50, and the end of rip cord 64 is securely attached to a tow hook 68 (see FIG. 2) customarily existing on the underside of the glider fuselage. Since tow hook 68 is customarily provided on many model aircraft of this type, the cutaway 50 serves to provide sufficient space to accommodate tow hook 68 when adaptor 42 is mounted on the fuselage. As best seen in FIG. 13, which shows how parachute 40 is deployed upon initial separation of the pod from the plane, rip cord 64 includes a replaceable, breakable link 70. Link 70 consists of a segment of relatively light cotton basting thread 72 (for example, a 1-pound test has been found suitable) having a pair of closeable connector elements 74 at opposite ends, one connector element 74 connecting to parachute 40 and the other to a heavier segment of the rip cord which connects to the tow hook 68. This heavier segment could be, for example, 12-pound test line. Rip cord 64 is so constructed that, when power pod 22 initially separates from the glider, the portion of rubber band 62 extending across the open rear end of the pod housing is displaced from the opening to permit parachute 40 to be withdrawn from the housing. As the pod continues to fall away from the plane, rip cord 64 withdraws parachute 40 permitting the parachute to deploy. (It will be appreciated that, although FIG. 13 shows parachute 40 as being fully deployed while rip cord 64 is still intact, such may not actually be the case since some time may be required for the parachute to completely fill with air.) As the pod continues to fall away, a point is reached where the rip cord becomes sufficiently taut that the breakable link 72 snaps. When this happens, the entire pod assembly and parachute is disconnected from the glider plane and can fall to earth as indicated in FIG. 15. With the aforementioned arrangement, it has been found that the separation of the power pod from the glider plane has a minimum effect on the glider plane.

In FIG. 15, it will be noted that parachute 40 is attached via a small attachment hole 76 in the front wall of the pod housing to permit the pod to fall to earth in approximately the orientation indicated in FIG. 15. Attachment hole 76 is approximately at the c.g. of the pod. By so controlling the orientation of the pod during its descent, the potential for damage to the pod upon impact with the ground is minimized because the pod will tend to land first on propeller 28, which is a sturdy plastic, and then either on the integral fuel tank 29 or the bottom front of the pod housing.

In light of the foregoing description, the advantages of the present invention can now be more fully appreciated. Prior to take-off, the operator will have set propulsion source 26 to provide optimum thrust angle for the particular glider plane with which the power pod is used. The operator does not have to go through the long and cumbersome procedure of setting up a tow cable and worrying about the direction of the wind. With the present invention, all that is necessary is that the operator couple power pod 22 with the glider plane 20 by engaging the power pod with the adaptor 42. The engine 28 is started in usual fashion. The operator can then head the glider plane into the prevailing wind and release the plane for take-off. Power pod 22 now propels the glider plane 20 into flight and can carry the plane until the supply of fuel contained within fuel tank 29 is exhausted. At this time, the propulsion source 26 ceases to provide a forward thrust to the glider. Accordingly, lug 32 and rod 34 fall rearwardly and downwardly off their respective ledges 52, 54 to separate the pod housing from the adaptor. Note that all this occurs by force of gravity and without the need to have any additional ejection force, either explosive or otherwise. Although gravity provides the primary separation force, it will be appreciated that the drag of the pod could assist in separating the pod from the glider. As the power pod falls away from the glider plane, parachute 40 is deployed, rip cord 64 breaks, and the pod is thereafter gently carried to earth. The glider plane can now continue its flight at the pleasure of the operator. The pod is intended to be retrieved for reuse. In order to reuse the pod, only link 70 need be replaced, and this can be done by disconnecting the connector elements 74 and reconnecting a complete new link 70. The parachute is then restored within the pod housing, and rubber band 62 is located on the pod as indicated in FIGS. 1 and 2.

In the event that it would be desired to keep the power pod connected with the adaptor during the entire flight of the glider even after the fuel supply is exhausted, an arrangement such as that shown in FIG. 11 can be used. In order to permanently couple the pod with the adaptor, a rubber band 78 can be placed around the pod housing and the adaptor such that the forward end of the rubber band extends across the front of the adaptor and the rear of the rubber band extends across the upper portion of the open rear end of the pod housing. In this manner, rubber band 78 exerts a sufficient force on the pod assembly which cannot be overcome when operation of engine 28 ceases. Hence, lug 32 and rod 34 cannot fall off of the respective ledges 52 and 54, and this maintains the power pod connected with the glider plane during the entire flight of the glider plane.

FIG. 12 discloses a further embodiment of the invention wherein power pod 22 can be released at the command of a remote control radio signal supplied from the ground. Since many glider planes can be flight controlled from the ground by operator-directed command signals, this embodiment of the present invention takes advantage of the existing servo flight control mechanism already existing in the model glider. Briefly, one exemplary existing servo control mechanism includes a servo 80 which operates a control rod 82 to adjust control surfaces in the tail section of the plane. Servo 80 is capable of longitudinally displacing control rod 82 over a range of positions to thereby position the glider control surfaces over a range of positions. The servo 80 is actuated in conventional fashion in response to remote control radio signals supplied from the ground by an operator-controlled transmitter. Thus, the servo 80 and the control rod 82 typify existing radio controlled mechanism contained in the glider plane. Pursuant to this embodiment of the invention, a bell crank mechanism 84 is added to the existing control. Bell crank mechanism 84 provides an operative coupling between control rod 82 and a vertical pin 86 to release a rubber band 88 when it is desired to release the power pod from the glider. Pin 86 is guided through a vertical hole 87 in the forward end of adaptor 42 and through an aligned opening provided in the glider fuselage structure. Basically, rubber band 88, when in the position shown in FIG. 12, performs the same function as rubber band 78 in FIG. 11 in that the power pod is held connected with adaptor 42. However, when pin 86 is displaced upwardly and released from rubber band 88, rubber band 88 snaps onto the forward end of the pod and thereby ceases to exert a force holding the pod in engagement with the adaptor. At this time, the pod will fall away and separate from the glider plane as described in connection with the preceding embodiment. Bell crank mechanism 84 operates pin 86 as follows. Bell crank 84 is arranged to pivot about an axis 90 and has one lever arm 92 connected via a slot and pin with a collar 96 positioned on control arm 92 by means of a set screw. The other lever arm 98 of the bell crank includes an arcuate slot 100 which engages a right angle bend 102 at the upper end of pin 86. The bell crank mechanism is arranged in relation to the displacement of control rod 82 such that over a fraction of the total travel of control rod 82, bend 102 simply rides within groove 100. However, when control rod 82 is displaced rearwardly beyond this fraction of control rod travel, the end of groove 100 hits bend 102 and thereafter lifts pin 86 upwardly. With pin 86 displaced upwardly, rubber band 88 is released and the pod can now fall away from the glider plane. It has been found that with the typical remote-control-type glider the operator can readily learn to command displacement of control rod 82 to a position sufficient to release rubber band 88 without significantly affecting the flight of the glider plane. Thus, the operator on the ground can release the pod from the glider at any desired time in flight after engine 28 stops. It is hereby understood that the illustrated bell crank arrangement is merely exemplary and that other forms of mechanism for releasing pin 86 in response to predetermined command signals from the operator could be used.

From the foregoing detailed description, it can be seen that the present invention provides important benefits and advantages for model aircraft enthusiasts which promote their enjoyment of their hobby. While it will be apparent that the preferred embodiments illustrated herein are well calculated to fulfill the objects above stated, it will be appreciated that the present invention is susceptible to modification, variation, and change without departing from the scope of the invention as defined by the appended claims.

What is claimed is:

1. A power pod for powering a model aircraft having a fuselage into flight comprising: propulsion means for providing forward thrust; and coupling means for releasably coupling said propulsion means with the model aircraft, said coupling means comprising means for causing said propulsion means to power the model aircraft into flight when said propulsion means is developing forward thrust and means responsive to a predetermined change in the forward thrust developed by said propulsion means for permitting said propulsion means to separate from the model aircraft by force of gravity.

2. A power pod for powering a model aircraft into flight as claimed in claim 1 wherein said coupling means is structured to releasably couple said propulsion means with the model aircraft at longitudinally spaced locations.

3. A power pod for powering a model aircraft into flight as claimed in claim 1 wherein said propulsion means is disposed beneath the fuselage of the model aircraft.

4. A power pod for powering a model aircraft into flight as claimed in claim 1 further including an adaptor means affixed to the model aircraft, said coupling means being structured to releasably couple said propulsion means with said adaptor means.

5. A power pod for powering a model aircraft in to flight as claimed in claim 4 further including deformable, resilient means disposed between said adaptor means and the model aircraft, said deformable, resilient means being deformably contained therebetween.

6. A power pod for powering a model aircraft into flight as claimed in claim 5 wherein said coupling means is structured to releasably couple said propulsion means with said adaptor means at longitudinally spaced locations.

7. A power pod for powering a model aircraft into flight as claimed in claim 6 wherein said coupling means is structured to permit said propulsion means to move rearwardly and downwardly relative to said adaptor means when separating therefrom.

8. A power pod for powering a model aircraft into flight as claimed in claim 1 wherein said coupling means is structured to cause said propulsion means to separate from the model aircraft immediately upon termination of the forward thrust provided by said propulsion means.

9. A power pod for powering a model aircraft into flight as claimed in claim 1 wherein said coupling means is structured to cause said propulsion means to separate from the model aircraft in response to a command signal.

10. A power pod for powering a model aircraft into flight as claimed in claim 1 further including a pod element, said propulsion means being mounted on said pod element, said coupling means being structured to releasably couple said pod element with the model aircraft.

11. A power pod for powering a model aircraft into flight as claimed in claim 10 wherein said propulsion means comprises an engine and a propeller powered by said engine, said engine being mounted on said pod element.

12. A power pod for powering a model aircraft into flight as claimed in claim 11 wherein said pod element is disposed beneath the fuselage of the model aircraft and said engine and propeller are also disposed beneath the fuselage.

13. A power pod for powering a model aircraft into flight as claimed in claim 12 further including means for setting the direction of thrust developed by the engine and propeller to a desired angle over a range of angles relative to the longitudinal axis of the model aircraft fuselage.

14. A power pod for powering a model aircraft into flight as claimed in claim 12 wherein the direction of thrust of the engine and propeller is arranged to incline downwardly and forwardly at an acute angle relative to the longitudinal axis of the aircraft fuselage.

15. A power pod for powering a model aircraft into flight as claimed in claim 11 wherein said pod element has a hollow interior with an opening therein and further including a parachute contained within the interior of said pod element for deployment via said opening upon separation of said pod element from the model aircraft.

16. A power pod for powering a model aircraft into flight as claimed in claim 15 further including deployment means for positively effecting deployment of said parachute upon separation of said pod element from the model aircraft.

17. A power pod for powering a model aircraft into flight as claimed in claim 16 wherein said deployment means comprises a rip cord having one end thereof connected with the parachute and the other end thereof connected with the model aircraft.

18. A power pod for powering a model aircraft into flight as claimed in claim 17 wherein said rip cord includes a replaceable, breakable link.

19. A power pod for powering a model aircraft into flight as claimed in claim 10 including an opening at the rear of said pod element, a parachute contained within said pod element, retention means at least partially obstructing said opening to prevent deployment of said parachute, and release means for releasing said retention means so as to permit deployment of said parachute.

20. A power pod for powering a model aircraft into flight as claimed in claim 19 wherein said release means includes a rip cord extending from the parachute through said opening to connect with the model aircraft, said rip cord being arranged to remove said retention means from obstructing said opening as said pod separates from the model aircraft.

21. A power pod for powering a model aircraft into flight as claimed in claim 20 wherein said retention means comprises a rubber band disposed around said pod element and at least partially obstructing said opening at the rear of said pod element.

22. A power pod for powering a model aircraft into flight as claimed in claim 21 wherein said rip cord includes a replaceable, breakable link.

23. A power pod for powering a model aircraft into flight as claimed in claim 1 further including an adaptor element fixedly mounted beneath the fuselage of the model aircraft, a pod element, said coupling means being arranged to releasably couple said pod element with said adaptor element, said propulsion means being fixedly mounted on said pod element, and retention means for preventing said pod and the adaptor elements from separating irrespective of said predetermined change in forward thrust.

24. A power pod for powering a model aircraft into flight as claimed in claim 23 further including release means for releasing said retention means at a desired time in the flight of the aircraft.

25. A power pod for powering a model aircraft into flight as claimed in claim 1 wherein the longitudinal center of gravity of said propulsion means is disposed longitudinally forwardly of the longitudinal center of gravity of the model aircraft.

26. A power pod for powering a model aircraft into flight as claimed in claim 25 including means for varying the angle between the direction of thrust of the propulsion means and the longitudinal axis of the model aircraft fuselage.

27. A power pod for powering a model aircraft into flight as claimed in claim 1 further including an adaptor mounted on the model aircraft fuselage and a pod on which said propulsion means mounts, said coupling means releasably coupling said pod with said adaptor, said pod having a snug fit with said adaptor when coupled therewith.

28. A power pod for powering a model aircraft into flight as claimed in claim 1 further including a parachute deployable upon separation of said propulsion means from the model aircraft to carry said propulsion means to ground, said parachute connecting at approximately the center of gravity of said propulsion means.

29. A power pod for powering a model aircraft into flight comprising: propulsion means; adaptor means structured to conform at least approximately to the shape of a portion of the fuselage of the model aircraft and mounted securely thereon; and releasable coupling means for releasably coupling said propulsion means with said adaptor.

30. A power pod for powering a model aircraft into flight as claimed in claim 29 including a deformable material disposed between said adaptor means and the fuselage of the model aircraft to permit the adaptor to conform to the shape of the fuselage.

31. A power pod for powering a model aircraft into flight as claimed in claim 29 wherein the fuselage of the model aircraft includes a tow hook thereon, said adaptor means including an opening therein within which said tow hook lodges.

32. A propulsion source for a model aircraft comprising: a power pod releasably coupled with the model aircraft; a parachute contained within said pod for deployment upon separation of the pod from the model aircraft; and means for deploying the parachute comprising a rip cord connected between the parachute and the model aircraft, said rip cord including a replaceable, breakable link.

* * * * *